United States Patent [19]

Acevedo

[11] 4,341,293

[45] Jul. 27, 1982

[54] TORQUE-APPLYING, FREELY-REVERSIBLE TOOL AND DRIVE-HANDLE COUPLING WITH DIRECTION OF TORQUE-APPLICATION SELECTION

[76] Inventor: Ignacio Acevedo, 4066 Fenwick Rd., Columbus, Ohio 43220

[21] Appl. No.: 208,995

[22] Filed: Nov. 21, 1980

[51] Int. Cl.³ .................. F16D 41/20; B25B 13/46
[52] U.S. Cl. ................................ 192/43; 81/58.3; 81/63.1
[58] Field of Search .............. 192/43, 41 S, 81 C; 81/58, 58.3, 63.1

[56] References Cited

U.S. PATENT DOCUMENTS 1,704,062  3/1929  Star ................................. 192/43
2,792,094  5/1957  Baldwin et al. ................ 192/43
4,210,185  7/1980  Acevedo ...................... 81/58 X
4,235,133  11/1980  Acevedo ........................ 81/58

Primary Examiner—Allan D. Herrmann
Attorney, Agent, or Firm—William V. Miller

[57] ABSTRACT

A torque-applying coupling comprising a housing having members at its opposite ends for receiving a handle element and a tool element. Means is provided for operatively connecting said receiving members and comprises a double-spring clutch in the housing and a tool drive-shank disposed within the clutch for axial and rotative movement, along with a plurality of axially-aligned connecting and drive sleeves disposed within said spring clutch. The shank carries a drive portion which is axially movable with the shank into selective engagement with the sleeves to drive the shank in the desired direction.

14 Claims, 15 Drawing Figures

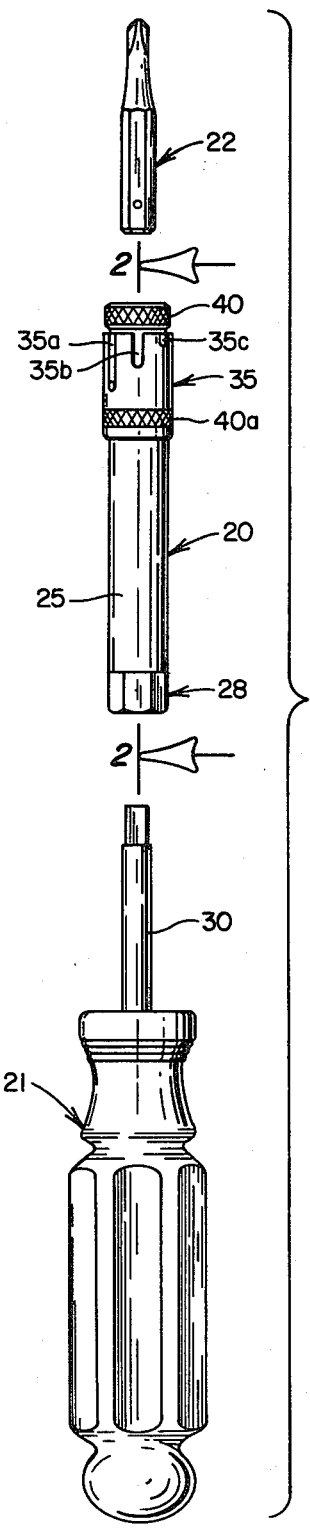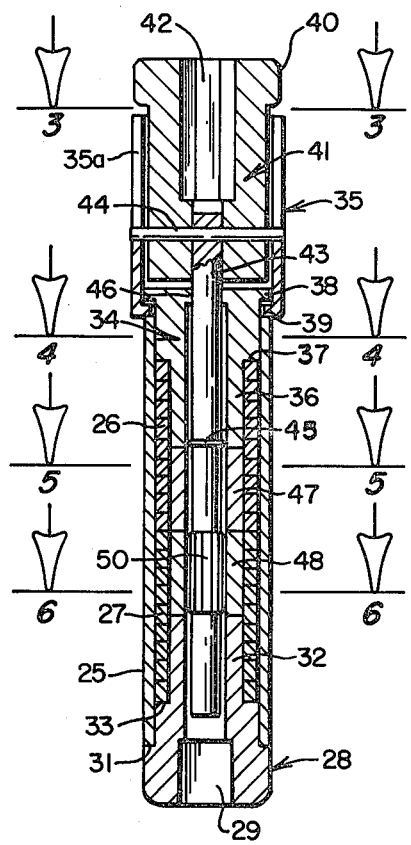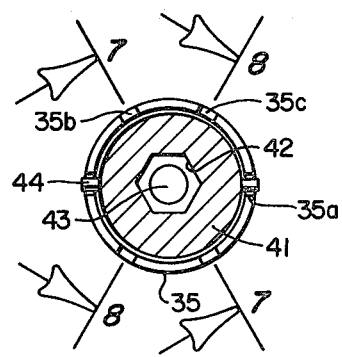

4,341,293

TORQUE-APPLYING, FREELY-REVERSIBLE TOOL AND DRIVE-HANDLE COUPLING WITH DIRECTION OF TORQUE-APPLICATION SELECTION

BACKGROUND OF THE INVENTION

In U.S. Pat. No. 4,235,133, dated Nov. 25, 1980, there is disclosed a coupling used between a handle and a tool having outwardly-opening tool-receiving sockets at its opposed ends for selectively receiving a tool shank and a separate intermediate torque-applying sleeve having outwardly-opening sockets at its opposed ends for selectively receiving a driving handle shank after it is passed through the cooperative tool socket. A pair of reversely wound springs surround the sleeve and when the handle shank is on one end socket of the sleeve and is turned in one direction, it will drive the tool socket at the other end, but the handle shank and socket can be freely turned in a reverse direction.

The device described above provides a satisfactory double spring-clutch arrangement for driving a tool selectively either in a clockwise or a counterclockwise direction, with free rotation in the opposite direction. However, to change from clockwise to counterclockwise drive, it is necessary to reverse the positions of the driving handle and the tool on the coupling which takes some time and effort.

In copending application Ser. No. 182,142, there is disclosed a handle assembly which overcomes the necessity of reversing the positions of the tool to obtain reverse drive by providing means for selecting the direction of rotation of a tool-driving shank merely by an axial positioning of the tool-driving shank in the handle assembly. However, this feature is embodied in a handle assembly and not in a separate coupling for connecting a tool-driving shank and drive handle shank.

The present invention provides this feature in a simple separate coupling which is provided with means for selecting the direction of drive rotation of the tool merely by an axial positioning of the tool-driving shank in the coupling.

SUMMARY OF THE INVENTION

The coupling of this invention is made so that it receives the tool in a socket at one end and the handle in a socket at the other end which are relatively rotatable. A double-spring clutch arrangement is provided in the coupling between the sockets so that when the handle is turned in one direction, torque is applied and the tool is driven in one direction but free rotation of the handle in the opposite direction is permitted. However, the coupling is provided with means for selecting the direction of drive rotation of the tool merely by axial movement of a tool-driving shank in the coupling. This selecting means can be selectively set to move the shank, which drives the tool socket, axially in the coupling so that the double-spring clutch functions to connect the handle to the tool, for applying torque, to selectively drive it either in a clockwise or counterclockwise direction and permit free reversal of the handle in the opposite direction, or to lock the handle to the tool so it can apply torque in opposite directions while precluding the free reversal in either direction.

BRIEF DESCRIPTION OF THE DRAWINGS

The best mode contemplated in carrying out this invention is illustrated in the accompanying drawings in which:

FIG. 1 is an elevational view showing the separated coupling of this invention axially between a drive handle and a tool;

FIG. 2 is an enlarged axial sectional view taken along line 2—2 of FIG. 1 showing the coupling with the tool drive shank, which carries the tool socket, in its rearwardmost retracted position;

FIG. 3 is a transverse sectional view taken along line 3—3 of FIG. 2;

DETAILED DESCRIPTION OF THE INVENTION

Figure 4:
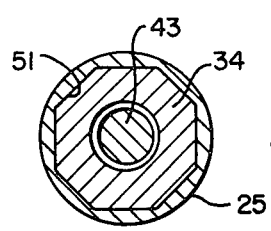
FIG. 4 is a transverse sectional view taken along line 4—4 of FIG. 2.
Figure 5:
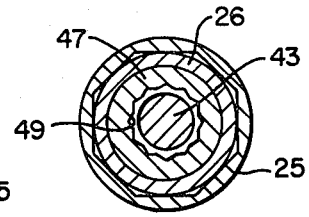
FIG. 5 is a transverse sectional view taken along line 5—5 of FIG. 2.
Figure 6:
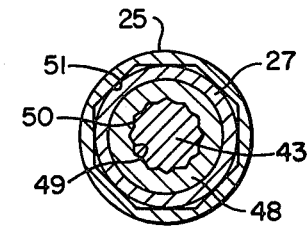
FIG. 6 is a transverse sectional view taken along line 6—6 of FIG. 2.

With specific reference to the drawings, and particularly to FIGS. 1 to 8 inclusive, the coupling of this invention is indicated generally by the numeral 20 and is shown separately in FIG. 1 associated with a torque-applying handle 21 and a tool element 22 which are to be positioned in sockets in opposite ends of the coupling. It is to be understood that the handle and tool are only examples of various handles and tools with which the coupling 20 of this invention can be used.

The coupling 20 comprises an outer tubular housing sleeve 25 which encloses a double-spring clutch which comprises a pair of axially-aligned springs consisting of the forward spring 26 and rearward spring 27 that are kept in alignment by the sleeve or housing 25 with which they frictionally engage. At the rear end of the sleeve, a handle receiving sleeve-like socket member 28 is press-fitted thereinto and this socket member has an outwardly or rearwardly-opening socket 29 for receiving an extension 30 on the handle 21. This socket member has an annular shoulder 31 which engages the rear end of the sleeve 25 and has a forward tubular sleeve-like extension 32 which projects into the rear end portion of the rear spring 27, the rear end of the spring abutting an annular shoulder 33 around the extension 32.

At the forward end of the sleeve 25, a sleeve-like retainer collar 34 is press-fitted thereinto and has a rearward sleeve-like tubular extension 36 which projects into the forward end portion of the forward spring 26, the forward end of the spring abutting with an annular shoulder 37 around the extension. Mounted for rotation on the retainer 34 is a spinner collar 35 which is of tubular form and of a diameter larger than the tube 25. The outer or forward extremity of the collar 34 has an annular shoulder 38 which is spaced outwardly from the forward end of the sleeve 25 to provide an annular groove into which projects an inwardly-directed retaining flange 39 on the adjacent end of the spinner 35. It will be noted that there is thus provided four sleeves, axially-aligned and abutting, namely, members 36, 47, 48 and 32 within springs 26 and 27.

Surrounded by the spinner collar 35, but projecting forwardly therefrom to provide a knurled knob 40, is a tool-receiving socket member 41 which has the outwardly or forwardly-opening socket 42 for receiving the tool 22. This socket member 41 is pinned to the forward end of a tool-driving shank 43 by a transverse pin 44 which projects in both directions radially outwardly from the annular socket member 41 into a selected slot of three pairs of opposed forwardly and rearwardly extending outwardly-opening slots, formed in the spinner 35. These pairs of slots are numbered 35a, 35b and 35c and are formed at angularly-spaced positions in the spinner. They extend from the forward edge of the spinner inwardly to varying depths, the pair 35a being the deepest, the pair 35b being of intermediate depth, and the pair 35c being the most shallow.

Thus, the tool-driving shank 43 will drive the socket member 41 which is pinned non-rotatably thereto. However, the shank 43 is movable both axially and rotatably within the retainer collar 34. The spinner 35 will rotate with the socket member 41 because it is pinned thereto by the pin 44. To selectively position the pin 44 in any of the pairs of slots 35a, 35b or 35c, it is merely necessary to engage the knob 40 with the fingers, pull the socket member 41 outwardly, align the pin with the selected pair of slots and then push the knob inwardly or rearwardly to position the pin in the selected pair of slots. Knurled ring 40a is formed on spinner 35 to facilitate gripping by the fingers. When the pin 44 is in any pair of slots, even the deepest 35a, the inner end or rear end of the socket member 41 will be spaced from the outer or forward end of the retainer collar 34 so as to permit relative rotation. An O-ring stop 45, intermediate the length of the tool-driving shank 43, limits outward extension of the shank by engaging the annular stop shoulder 46 adjacent the outer end of the retainer 34. The innermost or rearwardmost position of the shank is determined by pin 44 in a selected pair of slots 35a, 35b, or 35c.

Axially-aligned connecting and drive sleeves 47 and 48 are provided between the retainer collar 34 and the handle-receiving socket member 28. Forward sleeve 47 is disposed within the rear or inner end of the spring 26 while rear sleeve 48 is disposed within the forward or inner end of rear spring 27. Each of these sleeves has an exterior cylindrical surface for frictional engagement with its respective spring 26 or 27 and an interior angular spline surface 49 (FIG. 5) for engagement with a complemental angular spline surface on a drive section 50 of the shank 43. The shank 43 is mainly cylindrical and the drive section 50 is formed thereon towards but spaced from the rear end thereof. Section 50 is adapted to be moved into selective engagement with either connecting and drive sleeve 47 or 48, or both, by axial movement of shank 43 to provide a spline connection.

It wll be noted that the interior surface of the housing sleeve 25 is also angular, as indicated at 51, and that the portion of the retainer 34, which fits in the forward end thereof (FIG. 4), is of complemental angular formation. Similarly, the portion of the handle-receiving socket member 28 which fits into the rear end thereof is of complemental angular formation. Thus, the sleeve 25 connects the members 28 and 34 non-rotatably together. Axial movement of the shank 43 in the members 34, 47, 48 and 28 is permitted. Rotative movement of shank 43 is permitted in these members except that when drive section 50 engages either of the drive sleeves 47 and 48 it is non-rotatably connected thereto. Section 50 is equal in axial extent to that of sleeve 47 or 48.

Assuming the parts are in the condition shown in FIG. 2, because the pin 44 is set in the pair of deepest slots 35a in the spinner collar 35, the device will function to connect a handle 21, mounted on socket member 29, to a tool 22, inserted in socket member 41. In this condition, when the inserted handle extension 30 is turned clockwise, it will turn the socket member 28 and sleeve 25 clockwise, tightening the rear spring 27 about the rear drive sleeve 48, which is in engagement with drive section 50 of shank 43, to drive the shank in a corresponding direction and apply drive torque to the socket member 41, and the tool carried thereby, in the same direction. The spinner 35 is also driven in the same direction with the tool socket member 41 because it is pinned thereto. Retainer member 34 is also rotated by housing sleeve 25, which is connected to handle socket member 28, so it will turn with socket member 41. The forward drive sleeve 47 will rotate with forward spring 26 which will rotate with sleeve 25 and retainer 34. Free reverse rotation of the handle 21 will be permitted since, when the handle is turned in a reverse or counterclockwise direction, the rear spring 27 is unwound and does not grip the rear drive sleeve 48. At this time, the shank 43 is not connected to the socket member 28 but this socket member 28 is connected to the retainer 34 by sleeve 25 so member 28 will be reversed relative to tool socket member 41 and spinner member 35 carried by the shank. Retainer 34 will freely reversely rotate on shank 43 relative to spinner 35. Forward drive sleeve 47 will rotate freely relative to shank 43 with forward spring 26 and sleeve 25. To hold the tool on the work, during drive and reversal, the spinner 35 may be engaged with the fingers of one hand while the handle 21 is gripped with the other hand.

Figure 7:
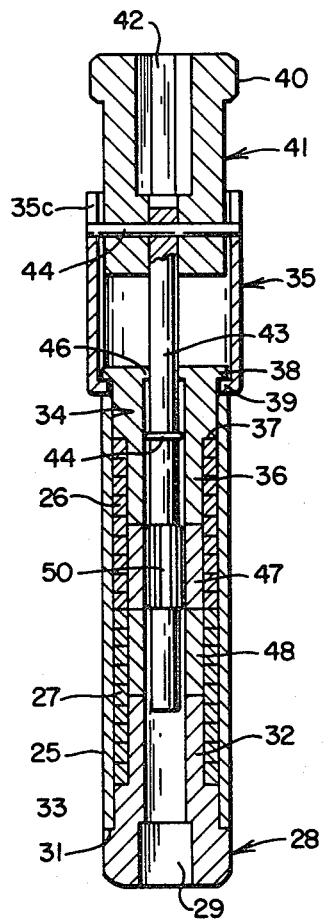
FIG. 7 is an axial sectional view taken along line 7—7 of FIG. 3 showing the tool drive shank selectively shifted into its forwardmost position.

If it is desired to drive the tool in a reverse direction, counterclockwise, and permit free reversal in the opposite direction, the pin 44 is set in the pair of shallow slots 35c of spinner 35 to position the parts as shown in FIG. 7 to move the tool drive shank 43 axially to its fowardmost or extended position as shown in FIG. 7. This will cause drive section 50 of the shank to be positioned within the forward drive sleeve 47. When socket 28 is turned counterclockwise by the inserted handle 21, the housing sleeve 25 is turned to cause the forward spring 26 to tighten on and turn forward drive sleeve 47. This will turn shank 43, through section 50, and turn the socket 41, along the spinner 35, in a counterclockwise direction. At this time, retainer 34 will be turned in the same direction by sleeve 25. Rear spring 27 will rotate with sleeve 25 and will rotate rear drive sleeve 48 therewith but there is no connection between sleeve 48 and shank 43. Free reversal of the handle 21 will be permitted since when it is turned clockwise, the socket 28 is similarly turned, causing unwinding of the forward spring 26, releasing it from the forward drive sleeve 47 and permitting free reversal of the handle socket 28. Housing sleeve 25, rear spring 27, rear drive sleeve 48, and retainer 34 will all rotate in a reverse direction relative to tool socket 41 and spinner 35 which will be used to hold the tool 22 on the work through the non-reversing tool socket member 41.

Figure 8:
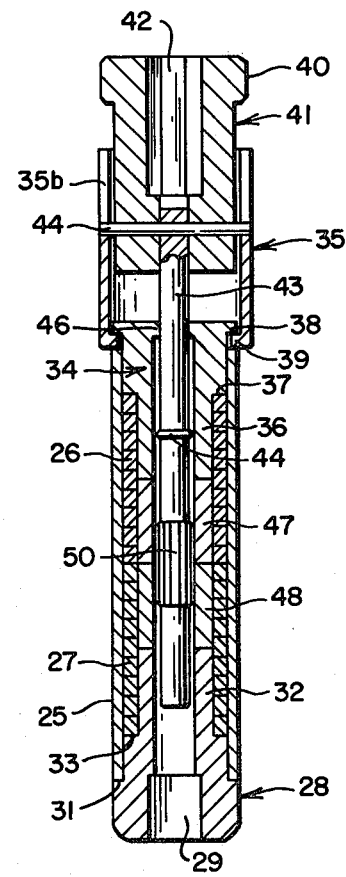
FIG. 8 is a similar view taken along line 8—8 of FIG. 3 showing the shank selectively shifted into its intermediate position.
Figure 9:
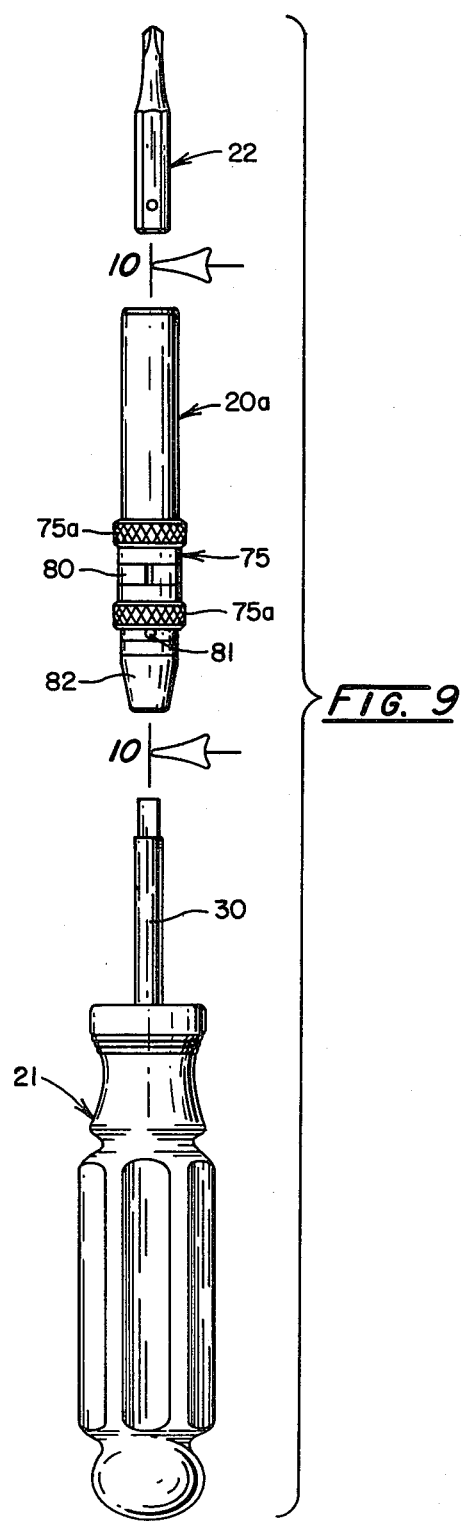
FIG. 9 is a view similar to FIG. 1 but showing a modification of the invention.

If it is desired to use the handle 21 as a fixed handle, the pin 44 is set in the pair of slots 35b of spinner 35 which are of intermediate depth. This will position the shank 43 axially in an intermediate position, as shown in FIG. 8, where the drive section 50 thereof extends into both drive sleeves 47 and 48 and connects them together as a single unit. Consequently, the two opposed spring clutches 26 and 27 will cooperate to prevent relative rotation of the tool 22 and handle 21 in either direction. Turning in one direction of the handle 21 and socket member 28, will cause spring 26 to function to apply torque to tool socket member 41 and the tool 22 therein and turning in the other direction will cause spring 27 to function to apply torque thereto so there will be no free-reversal. In one instance, the rear clutch spring 27 will tighten about rear drive sleeve 48 and in the other instance the forward clutch spring 26 will tighten about the forward drive sleeve 47.

In FIGS. 9 to 15, there is illustrated another form of coupling 20a used to couple the handle 21 to a tool 22. This modification also includes means for selecting the direction of application of torque to the tool. This means also, in this instance, includes a tool-driving shank which is selectively shifted axially between positions to locate a drive portion thereof in and out of axially aligned connecting and drive sleeves which are associated with a double spring clutch which consists of axially-aligned reversely-wound springs surrounding the drive sleeves.

Figure 15:
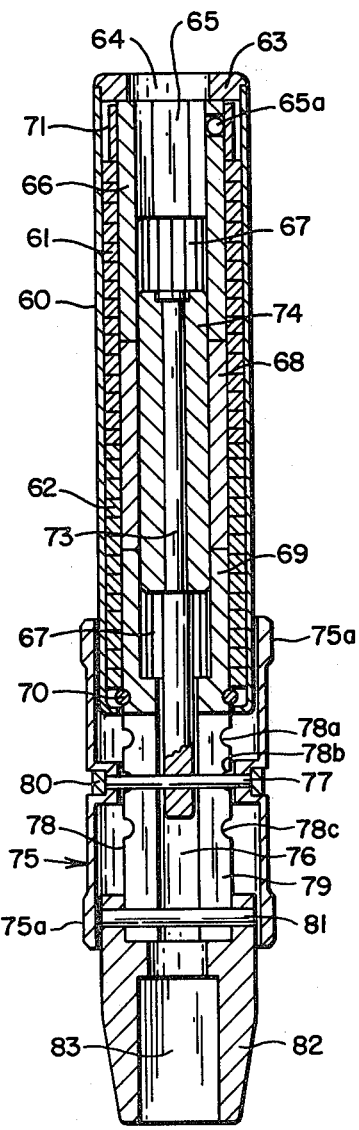
FIG. 15 is a view also similar to FIG. 10 but showing the tool drive shank selectively shifted into its intermediate position.

In this form of the invention, three axially-aligned abutting drive sleeves 66, 68 and 69 are enclosed within an outer sleeve of tubular housing 60 which is freely rotatable and can serve as a spinner. This housing sleeve 60 also houses the spring clutch which consists of reversely-wound forward spring 61 and rearward spring 62 surrounding the drive sleeves. The forward end of housing sleeve 60 has a retaining collar 63 press-fitted thereon and this collar has a central opening 64 through which the tool 22 may be inserted into an angular tool socket 65 formed in the outer end of the forward or outer drive sleeve 66. A spring-held detent ball 65a on the outer end of sleeve 66 normally holds the tool in the socket 65. Axially inwardly of socket portion 65, the sleeve 66 has a different angular drive section 67 which extends inwardly for the remainder of its length. Axially inwardly or rearwardly of the drive sleeve 66 is the intermediate drive sleeve 68 and axially inwardly or rearwardly thereof is the third rear drive sleeve 69, both of these having inner angular spline drive surfaces 67. The outer surfaces of the axially-aligned sleeves 66, 68 and 69 are cylindrical and snugly receive the opposed surrounding springs 61 and 62 which are enclosed within the housing sleeve 60. It will be noted that the inner ends of the two springs abut midway of the length of the intermediate sleeve 68 and are retained axially in position by a split retaining ring 70, at the rear or outer end of rear sleeve 69, and the split retaining spring band 71, which retains the detent ball 65a and is located on the forward or outer end of forward sleeve 66. Mounted within the drive sleeves 66, 68 and 69 for axial movement therein, is the tool-driving shank 73 which has an elongated driving spline sleeve 74, freely rotatable thereon at its forward end, the exterior of which is of angular formation complemental to the inner spline drive surface 67 of the drive sleeves. This section 74 is of an axial extent greater than that of intermediate drive sleeve 68 so that in an intermediate axial position it can extend completely therethrough (FIG. 15). The rear end of shank 73 projects into a central bore 76, formed in an extension 78 of rear drive sleeve 69, and is pinned by a transverse pin 77 to a tubular selector member 75. Member 75 has an inner or forward end which telescopes for axial and relative rotary movement over the rear end of the housing sleeve 60. The pin 77 also extends transversely through opposed elongated slots 79 (FIG. 13) which permit the pin to move forwardly and rearwardly with selector 75. The extension 78 has three annular locating grooves 78a, 78b, and 78c formed at axially spaced positions on the exterior thereof. A detent ball 80a is adapted to be selectively positioned in any of such grooves to hold the selector 75 in a selected axial position relative to housing sleeve 60. This ball is held in position by a split band spring 80 located in an annular groove in the exterior of selector 75. This band also holds pin 77 in position by engaging the ends thereof. The outer end of the extension 78 is pinned, by a transverse pin 81, to a socket member 82 which has a socket 83 for receiving the handle extension 30. Selector 75 has knurled bands 75a at each end to facilitate shifting thereof.

Figure 10:
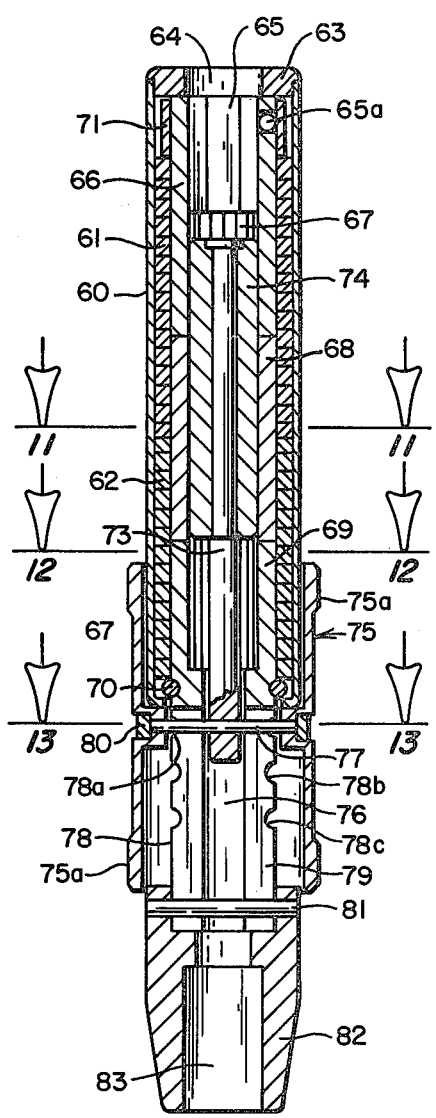
FIG. 10 is an enlarged axial sectional view taken along line 10—10 of FIG. 9 showing the tool drive shank in its rearwardmost position.
Figure 11:
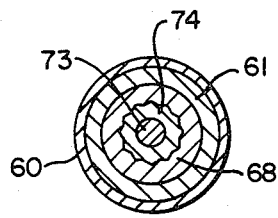
FIG. 11 is a transverse sectional view taken along line 11—11 of FIG. 10.
Figure 12:
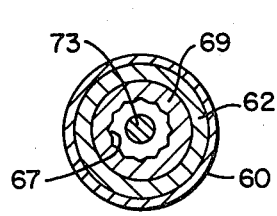
FIG. 12 is a transverse sectional view taken along line 12—12 of FIG. 10.
Figure 13:
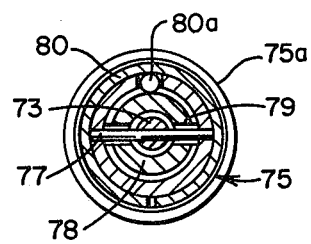
FIG. 13 is a transverse sectional view taken along line 13—13 of FIG. 10.

Assuming the parts are in the condition shown in FIG. 10, because the detent ball 80a on locator sleeve 75 is in the forwardmost groove 78c, the device will function to connect handle 21, mounted on socket 82, to a tool 22, inserted in socket 65 to apply driving torque thereto in a clockwise direction. At this time, the drive spline sleeve 74, on tool drive shank 73, will be so located axially that it will extend into forward drive sleeve 66 and intermediate drive sleeve 68 to connect them together as a unit but will not extend into rearward drive sleeve 69. Rotation of the handle 21 in a clockwise direction, will rotate socket member 82, extension 78 of rear drive sleeve 69 and the sleeve itself, and this will cause the rear clockwise-wound spring 62 to tighten on both the rear sleeve 69 and the intermediate sleeve 68 to drive the sleeve 68. Since sleeve 68 is connected to forward sleeve 66 by spline sleeve 74, the forward sleeve 66 will also be driven and will apply torque to the tool in the socket 65. Free reversal of the handle 21 and socket 82 will be permitted, since counterclockwise rotation of the socket 82 by the handle 21 will rotate the rear sleeve 69 in rear spring 62 and tend to unwind it and, therefore, there will be no connection between the rear sleeve 69 and intermediate sleeve 68. Shank 73 will rotate in spline sleeve 74 so as not to reverse forward sleeve 66. Thus, the tool in socket 65 will not be reversed. During both tool drive and free-reversal of the handle, the fingers of one hand can grip the freely rotatable housing sleeve 60, which serves as a spinner, while the handle 21 is turned with the other hand.

Figure 14:
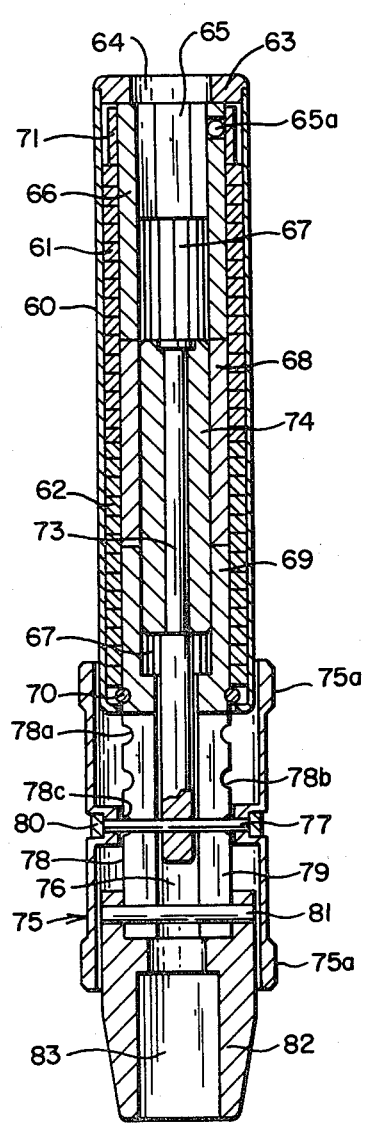
FIG. 14 is an axial sectional view similar to FIG. 10 but showing the tool drive shank selectively shifted into its forwardmost position.

If it is desired to drive tool 22 in a reverse or counter-clockwise direction, the ball 80a is positioned in the rearwardmost groove 78a by the locator 75 to position the parts as shown in FIG. 14. This will position the spline sleeve 74, carried thereby, in the intermediate drive sleeve 68 and rear drive sleeve 69 to connect them together as a unit. Sleeve 74, however, will not extend into forward sleeve 66. Now, if socket 83 is turned by the handle 21, counterclockwise, the rear sleeve 69 will drive intermediate sleeve 68, through spline sleeve 74, and cause it to tighten forward spring 61 about both intermediate sleeve 68 and forward sleeve 66. This will apply torque in a counterclockwise direction to socket 65 and the tool 22 carried thereby. Free reverse or clockwise turning of the handle 21 will be permitted, since rear sleeve 69 is connected to intermediate sleeve 68, by spline sleeve 75 that rotates within forward spring 61 in an unwinding direction and forward spring 61 will not grip the forward sleeve 66 to reverse it and the tool carried thereby. During driving of the tool 22 and reversing of the handle 21, the freely rotatable housing sleeve 60 may be gripped as a spinner.

If it is desired to use the handle as a fixed handle, the detent ball 80a is located in the intermediate groove 78b to locate the shank 73 axially in an intermediate position as shown in FIG. 15. This will locate the spline drive sleeve 74 in an axial position where it will connect all the drive sleeves 66, 68 and 69 as a single unit. Thus, handle socket 82 and tool socket 65 are non-rotatably connected together and the spring clutches 61 and 62 will have no effect thereon. Housing sleeve 60 will still be freely rotatable and can be used as a spinner to be gripped by the fingers of one hand to hold the tool on the work.

It will be apparent from the above that in both forms of the invention, the assembly in the form of a coupling will be used between a handle and a tool to apply driving torque from the handle to the tool. In both forms, the coupling can be adjusted to drive the tool in either of two directions and permit free reversal of the handle in the opposite direction or to merely lock the handle and tool together as a unit. This is accomplished, in both forms, by merely setting the tool-driving shank in any of three axial positions so as to position a driving portion carried by the shank axially relative to drive and connecting sleeves which surround the shank and are surrounded by the opposed springs of the double-spring clutch. As previously indicated, the handle and tool may take different forms. The handle and tool may fit over the respective ends of the coupling instead of into the socket members shown herein. Other arrangements may be provided which do not affect the basic structure of the coupling.

Having thus described the invention what is claimed is:

1. A torque-applying assembly having members for carrying a handle element and a tool element comprising a housing; means for operatively connecting said handle element and tool element carrying members comprising; a double-spring clutch in the housing with two axially-aligned springs, a tool drive-shank disposed within the spring clutch for axial and rotative movement therein, a connecting and drive sleeve arrangement between the shank and the clutch springs comprising a plurality of axially-aligned drive sleeves disposed in abutting relationship within said springs, said shank carrying a drive portion thereon axially movable therewith into selective engagement with the sleeves to drive the shank, and means for selectively axially adjusting the shank to position said drive portion axially relative to said sleeves for driving the shank in the desired direction.

2. A torque-applying assembly according to claim 1 in which the tool-carrying member is connected to the tool drive-shank to be rotated thereby, and the handle-carrying member is on one of said sleeves for rotating it.

3. A torque-applying assembly according to claim 1 in which the springs consist of a forward spring and a rearward spring, all of said sleeves being surrounded by said springs for clutching thereby, said drive portion of said tool drive shank being axially movable therewith into selected sleeves so as to be driven thereby.

4. A torque-applying assembly according to claim 2 in which the sleeves include a rearwardmost sleeve and a forwardmost sleeve with at least one intermediate sleeve, said handle-carrying member being on the rearwardmost sleeve.

5. A torque-applying assembly according to claim 4 in which the tool-carrying member is non-rotatably disposed on the tool-drive shank at its forward end.

6. A torque-applying assembly according to claim 5 in which the tool-carrying member is in the form of a forwardly-opening socket member and the handle-carrying member is in the form of a rearwardly-opening socket member.

7. A torque-applying assembly according to claim 1 in which the housing is a tubular housing having forward and rearward ends, said axially-aligned springs of the spring clutch comprising forward and rearward springs disposed within the surrounding housing and engaging therewith and surrounding said drive sleeves, said tool drive-shank being disposed within said sleeves for axial and rotative movement and non-rotatably supporting the tool-carrying member at its forward end, said drive sleeves including a rearward sleeve which supports the handle-carrying member non-rotatably connected to the rear end of the housing and extending into the rear end of the rearward spring and a forward sleeve non-rotatably connected to the forward end of the housing and extending into the forward end of the forward spring along with a pair of sleeves intermediate the forward and rearward sleeves, said drive portion on the shank being selectively axially movable completely within either of said intermediate sleeves to select either one for driving the tool drive-shank or partially within both sleeves to connect them together as a single unit.

8. An assembly according to claim 7 in which said adjusting means comprises a collar rotatably mounted on the forward end of the housing in which the tool-carrying member is disposed for selective relative rotation, said member having a radially extending pin for selective fitting into forwardly opening slots of varying-depths formed at angularly spaced positions in said collar.

9. An assembly according to claim 8 in which the pair of intermediate sleeves have inner angular spline surfaces and the drive portion on the shank has a cooperating spline surface which extends axially a distance corresponding to the axial extent of one of said sleeves.

10. An assembly according to claim 9 in which the handle-carrying member includes a rearwardly-opening socket and the tool-carrying member includes a forwardly-opening socket.

11. An assembly according to claim 1 in which the housing is a tubular housing having forward and rearward ends, said axially-aligned springs of the spring clutch comprising forward and rearward springs disposed within the surrounding housing and surrounding said drive sleeves, said tool drive-shank being disposed within said sleeves for axial and rotative movement and non-rotatably supporting the tool-carrying member at its forward end, said drive sleeves including a rear sleeve which supports the handle-carrying member non-rotatably and extends into the rear end of the rearward spring and a forward sleeve which has a forward tool-carrying portion and a rearward portion extending into the forward end of the forward spring along with an intermediate sleeve disposed between the forward and rearward sleeves, said drive portion on the shank being selectively axially movable to connect the intermediate sleeve to the forward or rearward sleeves or to connect all the sleeves together as a unit.

12. An assembly according to claim 11 in which said adjusting means comprises a selector sleeve telescoping with the rearward end of the tubular housing for relative rotative and axial movement and fixed to the rear end of the tool drive-shank, said rearward drive sleeve having a rearward extension in which annular locating grooves are formed at axially-spaced positions and which is surrounded by said selector sleeve, and a spring-pressed detent on said selector sleeve for fitting into any selected one of said grooves.

13. An assembly according to claim 12 in which the forward, rearward and intermediate drive sleeves have inner angular spline surfaces and the drive portion on the shank has a cooperating angular spline surface which extends axially a distance greater than the axial extent of the intermediate sleeve.

14. An assembly according to claim 13 in which the handle-carrying member includes a rearwardly-opening socket and the tool-carrying member is a forwardly-opening socket in said forward drive sleeve.

* * * * *